United States Patent Office 2,755,292
Patented July 17, 1956

2,755,292

PHENYL PROPIONATE OF TESTOSTERONE

Colin Leslie Hewett, Glasgow, Scotland, assignor to Organon Laboratories Limited, London, England, a British company No Drawing. Application January 13, 1953,
Serial No. 331,116

Claims priority, application Great Britain
January 21, 1952

1 Claim. (Cl. 260—397.4)

This invention relates to new derivatives of compounds of the cyclopentanopolyhydrophenanthrene series and the preparation thereof, notably biologically active esters of these compounds and β-phenyl propionic acid esters.

It is known to convert hormones of the said series into esters, the activity of which is greater than that of these hormones themselves. As such are applied the esters of propionic acid, benzoic acid and phenyl acetic acid. To obtain steroid hormones having a longer duration of activity it has already been proposed to carry out the esterification with cyclopentyl propionic acid and cyclohexyl propionic acid.

It has been found that physiologically active steroid compounds having a free hydroxyl group capable of being esterified with a fatty acid, are capable of reacting with β-phenyl propionic acid to physiologically active derivatives, which have a longer duration of activity than the hitherto known derivatives of the respective active compounds and in addition in most cases have a higher degree of activity than the known derivatives.

As examples of these new β-phenyl propionates may be mentioned the mono-, di-esters of β-phenyl propionic acid and oestradiol, 17-ethinyl oestradiol, 17-methyl androstenediol-3,17, Δ$^{5,3}$,21-dihydroxy pregnene-20 one, oestrone, 11-desoxycorticosterone, 17-hydroxy 11-desoxy-corticosterone (Reichstein's substance S), 17-hydroxy corticosterone (Kendall's compound F), cortisone, testosterone, 17-ethinyl testosterone, 17-methyl testosterone.

These esters have not been described in literature as yet. They are capable of exerting a physiological action for a considerably long period of time and in many cases have a higher degree of activity than the known hitherto used derivatives of the various compounds.

This carries with it the great advantage that less injections are needed, while the high degree of activity renders it possible to maintain a therapeutical effect with a much lower dosage.

The new β-phenyl propionates can be prepared e. g. by condensating the steroid hormone with β-phenyl propionic acid anhydride, either without using the solvent, the reaction time being capable of being shortened by heating or in a solvent, e. g. pyridine, benzene or another suitable solvent or a mixture hereof.

They can also be prepared by means of β-phenyl propionic acid chloride in a solvent, such as pyridine or a mixture of benzene and pyridine, which should contain adequate pyridine to bind the split off hydrochloric acid. Other commonly used methods for the preparation of esters of carboxylic acids may also be applied here, such as the conversion of a diazo ketone with a carboxylic acid.

The following examples illustrate several methods for the preparation of these new esters.

*Example I.—Testosterone-β-phenyl propionate*

A solution of 10 gms. of testosterone in 30 cc. of pyridine is cooled in ice and 7.5 gms. of β-phenyl-propionyl chloride added slowly with stirring. The solution is then removed from the ice bath, left at room temperature overnight and then decomposed with ice. The solid ester is recrystallized from methanol; melting point 116–117° C. $(\alpha)_D^{20} = +88$ (c=1 in dioxane.

*Example II*

A solution of 10 gms. of testosterone in 30 cc. benzene and 10 cc. pyridine is cooled in ice and 7.5 gms. β-phenyl-propionyl chloride added dropwise with stirring. The solution is then removed from the ice bath, left overnight at room temperature and then washed with water, dilute sodium carbonate solution and then dilute hydrochloric acid solution. The benzene solution after drying is distilled to dryness and recrystallized from methanol; melting point 116–117° C.

*Example III*

To a solution of 10 gms. of testosterone in 30 cc. pyridine is added 12.5 gms. of β-phenylpropionic anhydride. After standing overnight at room temperature the solution is decomposed by addition of water, and the testosterone phenyl-propionate crystallized from methanol; melting point 116.5–117° C.

*Example IV*

10 gms. of testosterone and 12.5 gms. of β-phenyl propionic anhydride are heated together at 100° C. for five hours. The melt is then triturated with water and the solid washed with dilute sodium carbonate solution, dried and crystallized from methanol, melting point 116–117° C.

The following table gives a comparison of the properties of the new testosterone derivatives according to the invention, with the already known testosterone propionate derivatives. The table shows the mean seminal vesicle weights (in mgs.) at various intervals after a single intermuscular injection of 0.1 cc. into castrated rats; the results for a range of comparative injections (I to V) being given. The different injections listed are prepared as follows:

Injection I: Testosterone propionate in sesame oil 2.5 mgm. in 0.1 cc. oil.

Injection II: Testosterone phenyl propionate in sesame oil 2.5 mgm. in 0.1 cc. oil.

Injection III: Testosterone propionate in ethyl oleate 2.5 mgm. in 0.1 cc. of the oleate.

Injection IV: Testosterone phenyl propionate in ethyl oleate 0.5 mgm. in 0.1 cc. of the oleate.

Injection V: Testosterone phenyl propionate in ethyl oleate 2.5 mgm. in 0.1 cc. of the oleate.

TABLE

|  | 3 days | 5 days | 7 days | 9 days | 14 days | 21 days | 28 days | 35 days | 42 days |
|---|---|---|---|---|---|---|---|---|---|
| Injection I | 23.4 | 32.9 | 36.7 | 32.6 | 30.4 | 21.7 | 13.9 | 14.6 | 18.7 |
| Injection II | 33.2 | 48.1 | 91.4 | 120.2 | 76.8 | 60.2 | 58.3 | 50.3 | 41.6 |
| Injection III | 29.6 | 50.6 | 69.1 | 72.1 | 37.9 | 21.8 | 21.7 | 17.8 | 24.1 |
| Injection IV | 22.0 | 35.7 | 52.2 | 53.7 | 33.4 | 32.2 | 25.3 | 21.0 | 23.6 |
| Injection V | 29.6 | 40.8 | 107.6 | 122.2 | 134.5 | 101.8 | 70.1 | 62.0 | 45.4 |

It will be noted from the foregoing table that with Injection I maximum activity is obtained in seven days, whereas with Injection II maximum activity is reached in nine days with a much greater degree of activity; moreover even after 42 days the activity is still in general much higher than is reached at any time with Injection I. Comparison of Injections III and IV shows that the activity of the new derivative (Injection IV) is such that the fraction (one-fifth) of the active component present in the Injection IV compared with Injection III gives approximately the same results as with the propionate of Injection III. Comparison of the Injections III and V shows that with the same quantity of active material a still higher peak of activity is reached after fourteen days and that a great measure of activity is preserved even after 42 days.

*Example V.—$\Delta^5$3,21-dihydroxy 20-keto-pregnene-21-β-phenyl propionate*

A mixture of 40 gms. of 21-diazopregnenolone and 130 gms. of phenyl propionic acid was heated on a steam bath for 1 hour. The evolution of nitrogen had almost ceased after 25 minutes. The mixture which solidified on cooling, was allowed to stand 16 hours, dissolved in warm methanol, cooled rapidly and poured with stirring into an aqueous solution of sodium carbonate. The precipitate was collected by filtration and washed with warm water until the filtrate reacted alkali free to litmus. The dried crude material (41.5 gm.) was crystallized from methanol to give a faintly yellow amorphous solid, M. P. 108–109.5° C.; $(\alpha)_D^{20}=+31.5°$: yield 35.2 gm. After recrystallization from methanol the product had M. P. 110.5–112° C.

*Example VI.—11 - desoxycorticosterone - 21 - β-phenyl-propionate*

Pregnenediolone 21-β-phenylpropionate (34 gm.) was dissolved in dry toluene (1110 cc.) and cyclohexanone (178 cc.) and the solution distilled until the distillate was clear. Aluminum iso propoxide (8.1 gm.) dissolved in dry toluene (205 cc.) was added and the solution distilled under reflux for 45 minutes. The solution was then cooled rapidly and shaken for 20 minutes with a solution of Rochelle salts (21.9 gm.) in water (44 cc.). The mixture was steam distilled for 80 minutes to remove the toluene and cyclohexanone, cooled and the resulting sticky solid (30 gm.) collected by filtration and washed with a little warm water. The crude solid was dissolved in benzene (100 cc.) and filtered through a column of alumina. The benzene was distilled off and the residue crystallized from methanol. The solid was collected and washed with a little diethyl ether to give a colorless product. Recrystallization from methanol gave colorless crystals $(\alpha)_D^{20}=+170.5°$. The product had M. P. of 139–139.5° C.

*Example VII.—Oestradiol-3-β-phenylpropionate*

"α" Oestradiol (13 gm.) with M. P. 178° C. was dissolved in warm pure dry acetone (104 cc.) and sodium hydroxide solution (24.7 gm. in 260 cc. distilled water) added to the solution. The solution was then cooled to room temperature. β-Phenyl-propionyl chloride (16 cc.: freshly prepared and distilled) and sodium hydroxide solution (6.5 cc. of 18 gm. dissolved in 25 cc. distilled water) were added simultaneously over 1¾ hours with vigorous stirring. Stirring was continued for 45 minutes to ensure that all the acid chloride was decomposed. The ester was collected by filtration and after washing with sufficient 30% acetone to remove the mother liquors, was washed with cold distilled water and finally with warm water until the filtrate reacted as alkali free to red litmus. The ester at this stage weighed 14.8 gm.

The mother liquors were then treated as above with β-phenylpropionyl chloride (8 cc.) and sodium hydroxide solution (3.25 cc.) when a second small crop (2.6 gm.) was obtained. Further treatment gave a third crop (1.2 gm.) The three crops were bulked and crystallized from a mixture of diethyl ether and n-hexane when the ester was obtained as colorless crystals (16 gm.), M. P. 90.5–92° C.; $(\alpha)_D^{20}=+62.7°$. A specimen crystallized from isopropyl ether had M. P. 104.5–105.5° C.

*Example VIII.—Oestradiol-3:17-di-β-phenylpropionate*

β-Phenylpropionyl chloride (30 cc.) was added slowly and with cooling to a solution of "α" oestradiol (10 gm.) with M. P. 178° in pyridine (120 cc.). The cherry red solution was allowed to stand 16 hours at room temperature when it was poured into a mixture of dilute hydrochloric acid solution and ice. The gummy solid which separated, was dissolved in diethyl ether and washed with sodium carbonate solution, water, dilute hydrochloric acid and finally with water. The ethereal solution, after drying over sodium sulphate was evaporated to dryness and the residue crystallized from acetone to give colorless crystals (9.8 gm.) M. P. 125–127° C.

Concentration of the filtrate gave a second crop (2.8 gm.). The mother liquors were evaporated to dryness, the residue dissolved in benzene and filtered through a column of alumina. Removal of the benzene by distillation followed by crystallization of the residue from acetone gave colorless crystals (1.4 gm.) M. P. 122–125° C.

The first crop after one further crystallization from acetone had M. P. 130–130.5° C.; $(\alpha)_D^{20}=+38.7°$ in dioxane.

*Example IX.—Oestradiol-17-β-phenylpropionate*

A suspension of oestradiol-3:17-di-β-phenylpropionate (6 gm.) in 0.5% potassium carbonate solution in 95% methanol (1260 cc.) was stirred continuously for 7 hours. The small quantity of undissolved di-ester was removed by filtration and the filtrate neutralized on phenolphthalein with 10% acetic acid solution. The solution was concentrated to approximately 100 cc., diluted with water (400 ml.) and extracted with di-ethyl ether. The ethereal extract was washed with dilute hydrochloric acid solution, water, sodium carbonate solution and finally with water before drying over sodium sulphate. The ethereal solution was concentrated to approximately 25 cc., n-hexane added until slight turbidity resulted the sides of the flask scratched until the ester crystallized when a little more n-hexane was added and the mixture chilled at 0° C. for several hours. The 17-β-phenylpropionate (3.9 gm.) had M. P. 119–121° C. and after one recrystallization from a mixture of diethyl ether and n-hexane it had M. P. 119.5–121.5° C.; $(\alpha)_D^{20}=+54.5°$ in dioxane.

*Example X.—$\Delta^5$17α-methyl 3β,17β-dihydroxy androstene-3-β-phenylpropionate*

To a solution of 10 gm. of 17 α-methyl androstenediol in 20 cc. of pyridine are added 45 cc. of absolute benzene. The solution is cooled to −10° C. and to this is added dropwise, while stirring vigorously, a solution of 7 gm. of β-phenyl propionic acid chloride in 20 cc. of absolute benzene. The reaction mixture is stirred another 15 minutes and cooled down 24 hours at about 0— −5° C. Then it is poured out on a mixture of ice and water. The benzene layer is separated and then washed with 5% sulphuric acid (to acid reaction), with 5% sodium hydroxide solution and with water to neutral reaction. The benzene solution is dried on sodium sulphate, after which it is evaporated to small volume and then filtered through a column of 50 gm. of aluminum oxide. The resulting benzene eluates are evaporated to dryness. After recrystallizing the drying rest from methanol, one obtains 10 gm. of ester with M. P. 122.5–124.5° C. $(\alpha)_D^{20}=-47°$ (c=1.0 in dioxane).

*Example XI.—17-ethinyl oestradiol 3-β-phenylpropionate*

10 gm. of ethinyl oestradiol are dissolved in 40 cc. of pyridine and 10 cc. of benzene. To this solution which has been cooled down to −10° C., is added dropwise, while stirring vigorously, a solution of 8 gm. of β-phenyl propionic acid chloride in 20 cc. of benzene. After 24 hours' standing at 0—5° C. the reaction mixture is poured out into a mixture of ice and water. The benzene layer, after separating, is washed with 5% sulphuric acid solution, a 5% sodium hydroxide solution and with water. This solution, after drying on sodium sulphate, is evaporated to small volume and filtered through aluminum oxide. The benzene eluates are evaporated to dryness; after recrystallizing from benzene-petroleum ether, the drying rest yields 11 gm. of the ester with M. P. 105–106° C.; $(\alpha)_D^{20}=3.3$ (c=0.9 in dioxane).

*Example XII.—17-hydroxy-11-desoxycorticosterone, 21-β-phenyl propionate*

To a solution of 5 gm. of 17-hydroxy-11-desoxycorticosterone in 25 cc. of pyridine, which is cooled down to −10° C., is added dropwise, while stirring vigorously, a solution of 5 gm. of β-phenyl propionic acid chloride in 20 cc. of dried benzene. The reaction mixture is cooled for 24 hours at a temperature of 0—5° C. After pouring out the reaction mixture on a mixture of ice and water, the benzene layer is separated and then washed with 5% sulphuric acid solution, a 5% sodium hydroxide solution and with water. The benzene solution is then dried in sodium sulphate, evaporated to small volume and filtered through 25 gm. of aluminum oxide. The ester is eluded with ether and the resulting solution is evaporated to dryness. After recrystallization from methanol one obtains 5 gm. of the ester with M. P. 170–172° C.; $(\alpha)_D^{20}=+118°$ (c=0.8 in dioxane).

*Example XIII.—Oestrone 3-β-phenylpropionate*

A solution of 10 gm. of oestrone in 40 cc. of pyridine is cooled down to −10° C. To this is added dropwise, while stirring vigorously, 10 gm. of β-phenyl propionic acid chloride in 20 cc. of dried benzene. After 24 hours' standing at 0—5° C. the reaction mixture is poured out on a mixture of ice and water. The benzene layer, after separating, is washed with a 5% sulphuric acid solution, then with 5% sodium hydroxide solution and with water. The benzene solution is dried on sodium sulphate and filtered through a column of 50 gm. of aluminum oxide. The benzene eluates are evaporated to dryness. The drying rest is recrystallized from acetone, which yields 12.4 gm. of the ester with M. P. 146–148° C.; $(\alpha)_D^{20}=+111°$ (c=0.9 in dioxane).

*Example XIV.—11-dehydro 17-hydroxy-corticosterone 21-β-phenylpropionate*

3 gm. of cortisone are dissolved in 40 cc. of pyridine. To this, after cooling down to −10° C., is added dropwise, while stirring vigorously, a solution of 3 gm. of β-phenyl propionic acid chloride in 10 cc. of benzene. The reaction mixture is left to stand for 24 hours at 0—5° C. and then poured out into a mixture of ice and water. The benzene layer is separated and then washed with a 5% sulphuric acid solution, then with 5% sodium hydroxide solution and with water. The benzene solution, after drying on sodium sulphate, is evaporated to small volume and filtered through a column of 15 gm. of aluminum oxide. The ester is eluted with a mixture of benzene and ether (50:50), then the eluates are evaporated to dryness. Finally the drying rest is recrystallized from a mixture of acetone and ether. Obtained are 3 gm. of the β-phenyl propionate with M. P. 175–177° C. $(\alpha)_D^{20}=+183°$ (c=0.5 in dioxane).

*Example XV.—$\Delta^4$ 11.17.21-trihydroxy-3,20-diketo pregnene 21-β-phenyl propionate*

To a solution of 200 mg. of compound F (Kendall) in 2 ml. of pyridine are added 0.2 ml. of β-phenyl propionic acid anhydride. The reaction mixture is left to stand overnight at room temperature. The ester is crystallized from aqueous acetone. The crystals have a M. P. of 138–139° C. $(\alpha)_D^{20}=+136°$ (c=0.7 in dioxane).

What I claim is:

The biologically active β-phenyl propionate of testosterone with M. P. 116–117° C.

References Cited in the file of this patent

UNITED STATES PATENTS

| | | |
|---|---|---|
| 2,109,400 | Miescher | Feb. 22, 1938 |
| 2,156,599 | Miescher | May 2, 1939 |

FOREIGN PATENTS

| | | |
|---|---|---|
| 208,892 | Switzerland | June 1, 1940 |